United States Patent [19]

Tomite et al.

[11] 4,306,167

[45] Dec. 15, 1981

[54] FLYWHEEL MAGNETO ROTOR AND MANUFACTURE METHOD THEREOF

[75] Inventors: Tosio Tomite, Katsuta; Nobuhiko Ogasawara, Mito; Hisanobu Kanamaru, Katsuta; Hideo Tatsumi, Mito, all of Japan

[73] Assignee: Hitachi, Ltd., Tokyo, Japan

[21] Appl. No.: 70,250

[22] Filed: Aug. 27, 1979

[30] Foreign Application Priority Data

Sep. 1, 1978 [JP] Japan ............................... 53/106257

[51] Int. Cl.$^3$ ............................................. H02K 21/22
[52] U.S. Cl. ................................. 310/153; 310/70 R; 310/156; 310/42
[58] Field of Search ................... 310/153, 156, 42, 70, 310/70 A

[56] References Cited

U.S. PATENT DOCUMENTS

| | | | |
|---|---|---|---|
| 4,012,651 | 3/1977 | Burson | 310/153 |
| 4,115,716 | 9/1978 | Ogasawara et al. | 310/153 |
| 4,137,884 | 2/1979 | Odazimo et al. | 310/153 |
| 4,146,806 | 3/1979 | Katsumata | 310/153 |
| 4,182,027 | 1/1980 | Benerecha | 310/153 X |

*Primary Examiner*—Donovan F. Duggan
*Attorney, Agent, or Firm*—Craig and Antonelli

[57] ABSTRACT

A joining construction between a flywheel of a flywheel magneto and a boss for mounting thereon a shaft comprises a joining portion formed on the periphery of the boss, and a joining portion of the flywheel surrounding the periphery of the boss. The joining portion of boss has an annular groove defined by a rugged bottom and both sides one of which is inclined along metal flow. The joining portion of the flywheel has the same shaped groove as one of the boss. Two the joining portions define an annular gap in which a joining member is disposed deformed by pressworking. The joining member inserted into the annular gap has the same shearing strength as the flywheel when an axial force is applied to the flywheel magneto.

11 Claims, 7 Drawing Figures

FLYWHEEL MAGNETO ROTOR AND MANUFACTURE METHOD THEREOF

BACKGROUND OF THE INVENTION

This invention relates to a rotor of a flywheel magneto and a manufacturing method thereof, and more particularly to a construction and method for joining a boss mounted on a driving shaft to a flywheel through metal flow of a joining member.

A flywheel magneto driven by an engine comprises a cup-shaped flywheel mounting thereon a plurality of permanent magnets, and a boss for joining the cup-shaped flywheel to a driving shaft of the engine. The boss has a flange overlapped on the cup-shaped flywheel. The overlapped flange and the cup-shaped flywheel are assembled by a plurality of rivets to form a rotor. In a space defined by the flywheel and the boss, a plurality of iron cors and coils are disposed. The cup-shaped flywheel is composed of heavy metal members because of moderating by its inertia any fluctuation of speed or torque in the engine. For the rotors of this kind of flywheel magnetos, it is necessary to satisfy the following conditions from the design point:

(a) not to involve any problem at a normal rotational frequency of 11,000 r.p.m, (b) not to break at 22,000 r.p.m, and (c) to endure a head variations of from 40° C. to 180° C. In consideration of the various conditions, the boss and the flywheel are fixed with 6~9 rivets which each are made of carbon steel and has a diameter of 4~6 mm. In order to satisfy the requirements of strength of the assembled rotor, a high dimentional precision in pitches between holes for the rivets is required. An error in measurement of the pitch in making the holes causes concentration of stresses in the rivets, which may results in loosing the joint portion of the rotor. Therefore, there is the problem of the costly production of such precise parts.

For providing a small size of the flywheel magneto, it is desirable to reduce its axial size. In this construction of the flywheel magneto, however, the axial size can not be reduced because the flange of the boss and the flywheel are overlapped, and the heads of the rivets projected into the inner space of the flywheel magneto are necessary to be spaced enoughly from the coil disposed in the inner space not to interfere with the coil during the rotation of the rotor, as shown in U.S. Pat. No. 3,783,315. It is difficult to reduce the thickness of the flywheel or the flange because the thinner can not endure a large load caused by the inertia due to the rotation of the rotor.

On the other hand, as joining of two members, force fit and welding are well-known. In the force fit, an error in measurement in making the members to be joined influences greatly joining strength, which is limited. Therefore, the force fit can not be applied for assembling the flywheel and the boss. The welding accompanys thermal deformation of a member to be joined because of being heated. Accordingly, it is difficult to manufacture the above-mentioned rotor with the desired accuracy by the welding.

Further, there is a method of joining two members by plastic deformation or metal flow of joining material of metal inserted between the members. Such a method is disclosed, for example in U.S. Pat. No. 3,559,946, wherein a groove having a rectangular section is formed on each face to be joined of two member, and a joining member of metal in filled in the groove through the metal flow. The joining material is not fully filled in the groove because the joining material does not flow rectangularly or along the surface of the rectangular groove. Therefore, there is a gap between the joining material filled and the surface of the groove so that sufficiently strong joining can not be obtained. Further, the joining material disclosed in the U.S. patent is filled only in a limited portion of the member to be joined, which means that the joining material is not utilized sufficiently. Accordingly, sufficient joining strength can not be obtained.

SUMMARY OF THE INVENTION

An object of the invention is to provide a rotor of a flywheel magneto which is large in mechanical strength, high in productivity and able to reduce its axial length, and a method of manufacturing the rotor.

Briefly stated, the present invention resides in joining a boss for mounting thereon a shaft to a flywheel of a flywheel magneto rotor through metal flow of a joining member of metal disposed between the opposite joining faces of the boss and the flywheel. In each of the joining faces, there is formed a groove which has an inclined face along the metal flow of the joining member and a rugged bottom.

A feature of the present invention is that the joining member filled in a space defined by the opposite joining faces has generally the same shearing strength as that of the joining portion of the flywheel when an axial force is applied to the rotor.

By such a joining construction, sufficiently high joining strength can be obtained within a thickness of the flywheel given, whereby the axial length of the boss and the flywheel assembled thereto is reduced, and the axial size of the flywheel magneto is reduced.

DESCRIPTION OF THE PREFERRED EMBODIMENT

Referring to FIGS. 1 to 4, an embodiment of a rotor of a flywheel magneto according to the invention is described hereinafter in detail.

Figure 1:
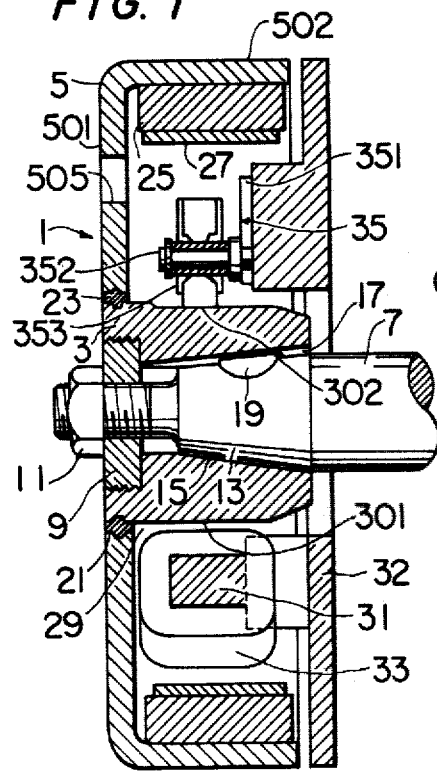
FIG. 1 is a sectional view of a flywheel magneto, wherein an embodiment of a rotor according to the invention is shown.

In FIG. 1, a rotor 1 of a flywheel magneto comprises a boss 3 and a flywheel 5. The boss 3 is rigidly connected to a driving shaft 7 of a machinery such as a crank shaft of an internal-combustion engine (not shown) by a washer 9 and a nut 11, with a tapered end portion 13 of the driving shaft 7 being inserted in a tapered hole 15. In the tapered hole 15, a key way 17 is formed, and a key 19 mounted on the driving shaft 7 is inserted in the key way 17. The flywheel 5 is joined to the boss 3 by a joining member 23. The flywheel 5 is cup-shaped, that is, it has a disc portion 501 and a cylindrical portion 502. Inside the cylindrical portion 502, a plurality of permanent magnets are secured thereto. The permanent magnets 25 each have a pole piece 27 secured thereto. The boss 3 has a straight cylindrical surface 301 on which a cam 302 is formed. The boss 3 and the flywheel 5 define an annular space 29, in which disposed are a plurality of iron cores 31 mounted on a base plate 32 fixed to a stationary such as an engine casing (not shown), a plurality of coils 33 each wound on each of the iron cores 31, and a breaker 35 for ignition mounted on the base plate 32. The breaker 35 comprises a base plate 351 fixed to the base plate 32, a shaft 352 rigidly inserted in a hole of the base plate 351, and an arm 353. The arm 353 has an intermediate portion swingably mounted on the shaft 352 and an end been in contact with the cam 302 of the boss 3 so that the other end actuates contacts (not shown).

In the flywheel magneto, a magnetic circuit is formed by a part of the flywheel 5, the permanent magnets 25 the pole pieces 27 and the iron core 31. Upon the rotation of the rotor 1, the magnetic fluxes change so that electric current is induced in the coil 33.

Figure 2:
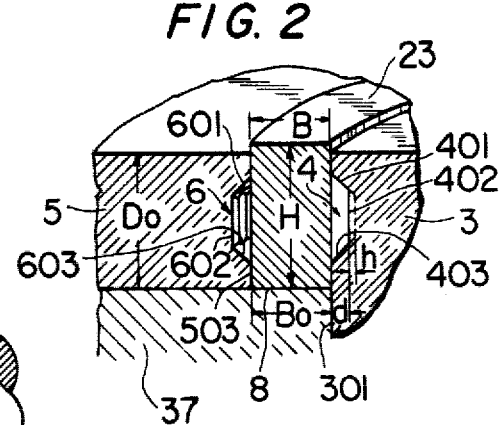
FIG. 2 is a partial sectional view of a boss, a flywheel and a joining member before assembling.

Joining between the boss 3 and the flywheel 5 must be firm because the flywheel 5, which carrys the permanent magnets 25 and the pole pieces 27, is very heavy in weight and attracted to the iron cores 31 by magnetic force. This joining construction will be explained hereinafter. In FIG. 2, the boss 3, which is made of structural steel, has an annular groove 4 formed on the outer cylindrical surface 301 by machining. The groove 4 has a rugged bottom 402 and sides 401 and 403 one 401 of which is inclined along a metal flow of the joining material 23. The rugged bottom 402 is formed by machining with a vibrating machine tool, or by pressing a roll with the surface knarled on the bottom 402. The rugged bottom is shaped in serrations in which grooves of teeth bottoms are in a axial direction of the boss 3. As the whole height (h) of the teeth, 0.2 ~ 1.0 mm is preferable, and 0.2 ~ 0.5 mm is particularly preferable. As the depth (d) of the groove 4 from the center of the whole height (h) to the outer surface 301, 0.2 ~ 1.0 mm is preferable, and 0.2 ~ 0.5 mm is particularly preferable. The flywheel 5, which is made of mild steel has a hole 21 made in the center thereof for providing a joining portion. In the inner surface, an annular groove 6 is formed thereby providing two annular landing portion in the both sides of the groove 6. The groove 6 comprises a rugged bottom 602, and two sides 601 and 603, one 601 of which is inclined along metal flow of the joining member 23. The shape and size of the groove 6 are substantially the same as these of the groove 4, respectively. In an annular gap 8 defined by the outer surface 301 of the boss 3 and the inner surface 503 of the flywheel 5, the joining member 23 is disposed. The joining member 23 is of mild or soft steel softer than the boss 3 and the flywheel 5, and has an annular shape. The width (B) of the joining member 23 is a little narrower than the width ($B_o$) of the gap 8, and the height (H) is the same as or a little higher than the thickness ($D_o$) of the flywheel 5.

Figure 4:
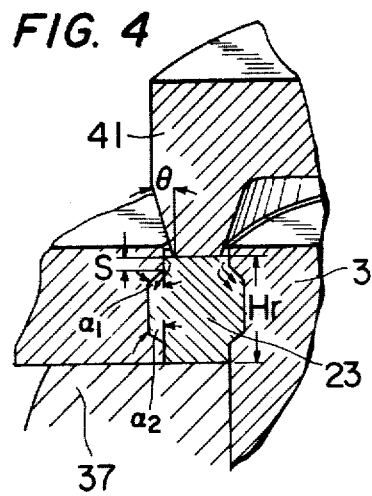
FIG. 4 is an enlarged sectional view of a part of FIG. 3.
Figure 3:
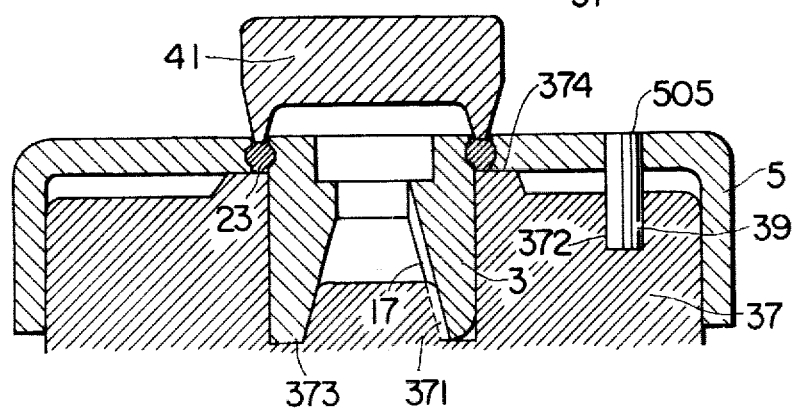
FIG. 3 is a sectional view of the assembly of the boss and the flywheel for explaining joining accompanying plastic deformation of the joining member.

As shown in FIG. 3, the boss 3, the joining member 23, and the flywheel 5 each are set on a die 37. The relative angular position between the boss 3 and the flywheel 5 is determined by the key way 17 and a hole 505 made in the flywheel 5, namely, a part 371 of the die 37 inserted in the key groove 17 and another part 372 of the die 37 inserting a guide pin 39 inserted in the hole 505 have a desired angle. The relative axial position of the boss 3 and the flywheel 5 are determined by a bottom 373 of a hole made in the die and the top face 374 of the die 37 so that the groove 4 of the boss 3 and the groove 6 of the flywheel 5 will be aligned each other. After then, a punch 41 presses the joining member 23 so that the joining member 23 will be plastically deformed and filled fully in the gap 8. Referring to FIG. 4, there is shown an enlarged part of FIG. 3. As shown in FIG. 4, a side of a working portion of the punch 41 is inclined by an inclination angle ($\theta$) from an axial line. The inclination angle $\theta$ prefers to be 3° ~ 15°. When it is less than 3°, it is difficult to pull out the punch 41 from the plastically deformed joining member 23. When it is more than 15°, a part of the joining member 23 flows out of gaps between the punch 41 and the boss 3 and between the punch 41 and the flywheel 5 when reduced, so that the joining member 23 may be not fully filled in the grooves 4 and 6.

A distance (S) between a pressing face of the punch 41 and the groove 4 or 6 expresses length of a friction face between the joining member 23 and the flywheel 5 or the boss 3. The length (S) prefers to be short because when it is longer, a pressing force of the punch 41 is consumed by friction so that the joining member 23 will be not fully filled in the grooves 4 and 6. The larger pressing force deforms the flywheel, which results in failing to manufacture an accruate rotor. Therefore, as the length (S), $\frac{2}{3}B_o$ is preferable.

When the depth of the groove 4 or 6 is less than 0.2 mm, slip takes place between the joining member 23 and the boss 3 or the flywheel 5, so that enough shearing force is not applied on the joining member 23, and when it is more than 1.0 mm, the joining member 23 is not fully filled in the groove 4 or 6 to leave an air gap between the joining member 23 and the rugged bottom 402 of the boss 4 or the rugged bottom 602 of the flywheel 5, so that enough torque can not be transferred.

The inclined sides 401, 601 of the grooves 4, 6 are inclined along the metal flow during the plastic deformation of the joining member 23, the inclination angle of which is the best at an angle of 45°, but an angle in the range of 35° ~ 55° can be practicable. At another side 403 or 603 of the groove 4 or 6, any inclination angles with 90° are practicable. From a viewpoint of shearing strength of the joining portion, the inclination angle of the side 403 or 603 is better at an angle about 45°.

The height (H) of the joining member 23 before the plastic deformation is determined relating to the thickness ($D_o$) near the joining portion of the flywheel 5 and the volume of the grooves 4 and 6. Namely, for the rotor, it is desired that the height (Hr) of joining member 23 after the plastic deformation is the same as or less than the thickness ($D_o$) of the flywheel 5, so that the height (H) of the joining member 23 before the plastic deformation is better to be approximately the same as the thickness ($D_o$) of the flywheel 5, or even if it is higher than the thickness ($D_o$), the difference is desirable to be 0.2 ~ 0.3 mm.

In joining of the boss 3 to the flywheel 5, according to the abovementioned, the joining member 23 is fully filled in the grooves 4 and 6 by press-working, and the whole joining member 23 is placed within the thickness ($D_o$) of the flywheel 5.

In the rotor 1 of the flywheel magneto, to which large force and torque are applied, as a relation of the grooves 4 and 6 to the thickness ($D_o$) of the flywheel 5 and strength of material to be used, it is better to satisfy the following relation. The relation will be described hereinafter, referring to FIG. 5.

Figure 5:
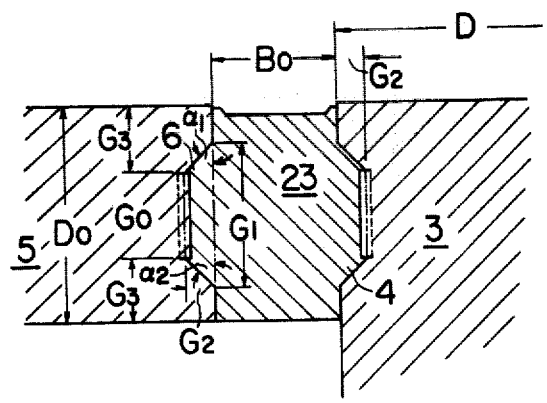
FIG. 5 is a diagram for explanation of a joining portion of the rotor shown in FIG. 1.

In FIG. 5, there is shown a joining portion of the rotor 1 by the metal flow of the joining member 23. Assuming that shearing stresses of material of the joining member 23 and the flywheel 5 be $\tau_1$ and $\tau_2$, respectively, when an axial force is applied, the shearing stresses $\tau_1$ of the joining member 23 are distributed on a section area corresponding to entrance width ($G_1$) of the groove 6, and the shearing stresses $\tau_2$ of the flywheel 5 are distributed on a section area corresponding to length ($G_3$) of one of the landing portions. The dimentional relation of the groove 6 is best when both the joining member 23 and the flywheel 5 are broken at the same time. Accordingly, the following equation is obtained;

$$G_1 = (\tau_2'/\tau_1')G_3 \quad (1)$$

$$D_o = G_1 + 2(G_3 - G_2/\tan \alpha) \quad (2)$$

wherein
$\tau_1'$, $\tau_2'$ are ultimate shearing strength of the joining member 23 and the flywheel 5;
Do, the depth of the groove 6; and
$\alpha$, inclination angle of the inclined face which is corresponding to $\alpha_1$ and $\alpha_2$.

The depth ($G_2$) of the groove 6 is small as compared with the thickness ($D_o$) of the flywheel 5, and the inclination angle ($\alpha$) is near angle of 45° practically. Therefore, the equation (2) can be given as follows;

$$D_o \approx G_1 + 2(G_3 - G_2) \quad (3)$$

By the equations (1) and (3), the following relation is obtained;

$$G_1 \approx (\tau_2'/2\tau_1' + \tau_2') \times (D_o + 2G_2) \quad (4)$$

The groove 6 made according to the equation (4) makes the joining portion of the flywheel 5 and the boss 3 stronger, and the minimized joining structure of the rotor can be obtained.

The groove 4 of the boss 3 is enough if it is approximately the same as the groove 6 of the flywheel 5 because material of the boss 3, usually, is stronger than the flywheel 5.

It is better that the length ($G_3$) of two the annular landing portion bottoms at the both sides of the rugged bottom is equal, because the same strength can be obtained no matter where the axial force orients.

Further, the rotor 1 is necessary to endure a large torque, that is, the joining portion of the rotor 1 is necessary to transmit a large torque. Value of the torque which can be transmitted by the joining portion of the rotor 1 changes according to radial position of the joining portion. The portion broken by a torque is the rugged bottom of the joining member 23 near the boss 3. Therefore, it is better than the diameter of the boss 3 is determined so that the required torque, for example, by design will not exceed the ultimate torque which the joining portion of a diameter can be transmitted.

Figure 6:
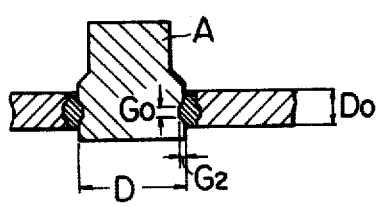
FIG. 6 is a sectional view of a test piece.
Figure 7:
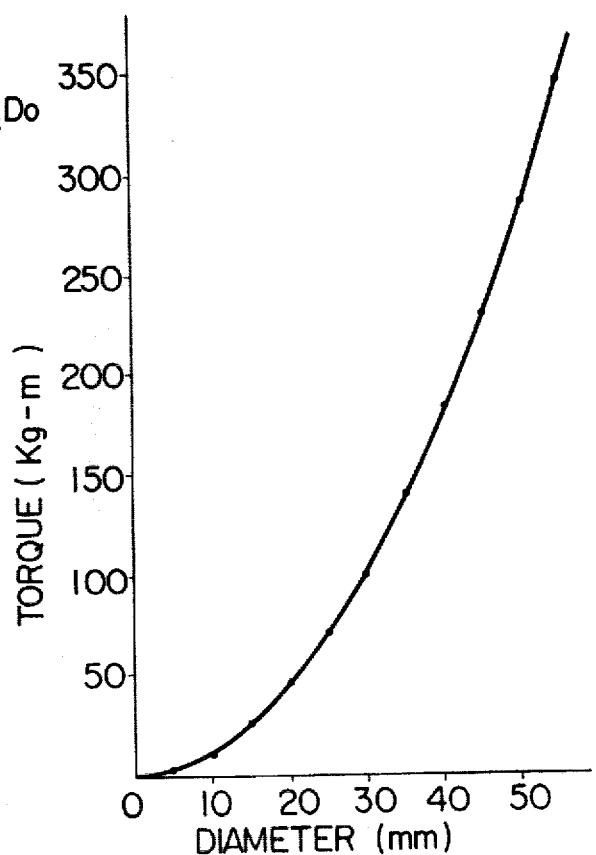
FIG. 7 is a graph showing a relation between torque and diameter, which is experimental results obtained by using the test piece shown in FIG. 6.

In FIG. 7 a relation between the ultimate torque and a diameter is shown. The relation is an experimental results which are obtained using test pieces shown in FIG. 6. In the test pieces, apart (A) of diameter (D) is made of structural steel and corresponding to the boss 3; parts (B) and (C) each are made of mild steel, thickness ($D_o$) of the part (C) being 5 mm. As groove shapes of the parts (A), (B) and (C), the grooves are 0.4 mm ($G_2$) deep and 2 mm ($G_o$) wide of the rugged bottom. The average ruggedness is 0.3 mm. A torque of about 100 kg-m is obtained at a diameter of 30 mm. In a conventional rotor assembly that a boss and a flywheel are rivetted at a diameter of 60 mm using 6 rivets of diameter 6 mm which are made of structural steel, the rotor is broken at the rivets by torque 92.5 kg-m. It is noted from the above that it is not necessary to provide the boss with a large diameter portion such as a flange.

Thus, the rotor of the flywheel magneto according to the invention is mechanically stable, and productive because it is produced mainly by press working. And the flywheel magneto can be reduced in axial size.

What is claimed is:

1. A rotor of a flywheel magneto comprising a boss rigidly mounted on a driving shaft, and a flywheel joined to the boss and carrying thereon a plurality of permanent magnets, wherein the improvement comprises:
   a joining portion of the boss including a cylindrical surface, and an annular groove formed in the cylindrical surface and having a rugged bottom and two sides, one of which is inclined so that metal flow along the inclined side can be effected;
   a joining portion of the flywheel including an inner face of a hole made in the flywheel for inserting the boss, and an annular groove made in the inner face of the hole and shaped similarly to the groove of the boss, the inner face of the hole being spaced from the cylindrical surface by a predetermined distance, and
   a joining member filled in an annular gap defined by both the joining portions of the boss and the flywheel through metal flow thereof and having a form imported by the annular gap, the form providing the joining member with approximately the same shearing strength as that of the joining portion of the flywheel.

2. The rotor of the flywheel magneto as defined in claim 1, wherein the annular grooves of the boss and the flywheel each are 0.2~1.0 mm deep, and the rugged bottom of the groove of the flywheel is placed substantially at the center of width of the joining portion of the flywheel.

3. The rotor of the flywheel magneto as defined in claim 2, wherein wholl the joining member filled in the gap is disposed within the width of the flywheel, whereby the axial length of the rotor can be reduced.

4. The rotor of the flywheel magneto as defined in claim 1, 2 or 3, wherein the flywheel and the joining member are made of mild steel and the boss is made of structural steel.

5. The rotor of the flywheel magneto as defined in claim 4, wherein the predetermined distance between the joining portions is approximately equal to axial length of the rugged bottom.

6. The rotor of the flywheel magneto as defined in claim 4, wherein the rugged bottom has a serrated surface, the grooves of which are in the axial direction of the boss.

7. A rotor of the flywheel magneto comprising a boss rigidly mounted to a driving shaft, and a flywheel joined to the boss and carrying thereon a plurality of permanent magnets, wherein the improvement comprises:
- a joining portion of the boss including an annular rugged portion, and two annular landing portions each extending axially from the annular rugged portion in the opposite direction;
- a joining portion of the flywheel surrounding the joining portion of the boss with a gap therebetween, including an annular rugged portion and two annular landing portions each extending axially from the annular rugged portion in the opposite direction, and being disposed so that the annular rugged portion faces one of the boss; and
- a joining member disposed in a space defined by both the joining portions to repulse the joining portions, the joining member having approximately the same shearing strength as that of one of the landing portions of the flywheel.

8. The rotor of the flywheel magneto as defined in claim 4, wherein one of the annular landing portions of the boss, and one of the annular landing portions of the flywheel each are provided with an annular slope along which metal flow of the joining member is effected.

9. The rotor of the flywheel magneto as defined in claim 8, wherein height between the annular rugged portion and the annular landing portion, and teeth height of the ruggedness each are between 0.2 and 1 mm.

10. The rotor of the flywheel magneto as defined in claim 8, wherein the rugged bottom is placed in the center of the width of the flywheel.

11. The rotor of the flywheel magneto as defined in claim 10, wherein the boss is made of structural steel, and the flywheel and the joining member each are made steel softer than the boss.

* * * * *